United States Patent
Kaji et al.

(10) Patent No.: US 11,402,209 B2
(45) Date of Patent: Aug. 2, 2022

(54) SENSOR

(71) Applicant: KABUSHIKI KAISHA TOSHIBA, Tokyo (JP)

(72) Inventors: Shiori Kaji, Kawasaki Kanagawa (JP); Ryunosuke Gando, Yokohama Kanagawa (JP); Yasushi Tomizawa, Fuchu Tokyo (JP); Kei Masunishi, Kawasaki Kanagawa (JP); Tamio Ikehashi, Yokohama Kanagawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 164 days.

(21) Appl. No.: 16/565,719

(22) Filed: Sep. 10, 2019

(65) Prior Publication Data

US 2020/0284582 A1 Sep. 10, 2020

(30) Foreign Application Priority Data

Mar. 8, 2019 (JP) .............................. JP2019-042469

(51) Int. Cl.
*G01C 19/5684* (2012.01)
*G01P 15/125* (2006.01)
(Continued)

(52) U.S. Cl.
CPC ..... *G01C 19/5684* (2013.01); *G01C 19/5726* (2013.01); *G01C 19/5733* (2013.01);
(Continued)

(58) Field of Classification Search
CPC ............ G01C 19/5684; G01C 19/5726; G01C 19/5762; G01P 15/125; G01P 15/0802;
(Continued)

(56) References Cited

U.S. PATENT DOCUMENTS 5,415,043 A * 5/1995 Zabler .................. B81B 3/0051
216/39
5,487,305 A * 1/1996 Ristic .................... G01P 15/125
73/514.18
(Continued)

FOREIGN PATENT DOCUMENTS

JP 2018-163141 A 10/2018
WO WO 2017/065312 A1 4/2017

OTHER PUBLICATIONS

Wang et al., "A comparative Study of Conventional Single-Mass and Amplitude Amplified Dual-Mass MEMS Vibratory Gyroscopes," 2017 IEEE Int'l Symposium on Inertial Sensors and Systems (INERTIAL), pp. 82-85 (2017).

*Primary Examiner* — Helen C Kwok
(74) *Attorney, Agent, or Firm* — Finnegan, Henderson, Farabow, Garrett & Dunner L.L.P.

(57) ABSTRACT

According to one embodiment, a sensor includes a movable member including a first movable portion and a second movable portion, and a first fixed member. At least a portion of the first fixed member is between the first movable portion and the second movable portion. The first fixed member includes a first fixed counter portion opposing the first movable portion, and a second fixed counter portion opposing the second movable portion. The first fixed counter portion includes a first fixed protruding portion protruding toward the first movable portion. The second fixed counter portion includes a second fixed protruding portion protruding toward the second movable portion.

15 Claims, 13 Drawing Sheets

(51) Int. Cl.
*G01C 19/5762* (2012.01)
*G01C 19/5733* (2012.01)
*G01C 19/5726* (2012.01)
*G01P 15/08* (2006.01)

(52) U.S. Cl.
CPC ........ *G01C 19/5762* (2013.01); *G01P 15/125* (2013.01); *G01P 2015/0805* (2013.01)

(58) Field of Classification Search
CPC ... G01P 15/18; G01P 15/08; G01P 2015/0805
See application file for complete search history.

(56) References Cited

U.S. PATENT DOCUMENTS

| | | | | |
|---|---|---|---|---|
| 6,105,428 A * | 8/2000 | Schmiesing | ........ | G01P 15/0802 361/283.3 |
| 6,272,926 B1 * | 8/2001 | Fehrenbach | .......... | B81B 3/0051 73/514.32 |
| 6,360,605 B1 * | 3/2002 | Pinter | ................... | B81B 3/0008 73/514.32 |
| 6,481,285 B1 * | 11/2002 | Shkel | ................. | G01C 19/5719 73/504.13 |
| 6,761,068 B1 * | 7/2004 | Schmid | .............. | G01C 19/5712 73/504.02 |
| 6,923,062 B2 * | 8/2005 | Franz | ................... | B81B 3/0051 73/514.01 |
| 7,905,146 B2 * | 3/2011 | Suzuki | ................... | G01C 19/56 73/514.33 |
| 2002/0109207 A1 * | 8/2002 | Rich | ................... | G01P 15/0888 257/586 |
| 2005/0229706 A1 * | 10/2005 | Vandemeer | ........... | G01P 15/125 73/514.38 |
| 2012/0280591 A1 * | 11/2012 | Schultz | ................. | B81B 3/0016 310/300 |
| 2013/0192370 A1 * | 8/2013 | Yoda | ..................... | G01P 15/125 73/514.01 |
| 2013/0277775 A1 * | 10/2013 | Roland | .............. | G01C 19/5747 257/415 |
| 2014/0196542 A1 * | 7/2014 | Naruse | ................ | G01P 15/0802 73/514.32 |
| 2015/0013458 A1 * | 1/2015 | Tanaka | .................. | B81B 3/0051 73/514.35 |
| 2015/0316582 A1 * | 11/2015 | Tanaka | .................. | G01P 15/125 73/514.32 |
| 2016/0061858 A1 * | 3/2016 | Tanaka | .................. | G01P 15/131 73/514.18 |
| 2016/0216290 A1 * | 7/2016 | Tang | ................... | G01P 15/0802 |
| 2016/0257557 A1 * | 9/2016 | Wu | ...................... | G01P 15/125 |
| 2018/0045515 A1 | 2/2018 | Simoni et al. | | |
| 2018/0274923 A1 | 9/2018 | Ikehashi | | |
| 2018/0299269 A1 * | 10/2018 | Anae | .................. | G01C 19/5762 |
| 2019/0002274 A1 * | 1/2019 | Cardanobile | ....... | B81C 1/00658 |
| 2019/0145772 A1 * | 5/2019 | Acar | ..................... | B81B 3/0018 73/504.12 |

* cited by examiner

SENSOR

CROSS-REFERENCE TO RELATED APPLICATIONS

This application is based upon and claims the benefit of priority from Japanese Patent Application No. 2019-042469, filed on Mar. 8, 2019; the entire contents of which are incorporated herein by reference.

FIELD

Embodiments described herein relate generally to a sensor.

BACKGROUND

There is a sensor such as a gyro sensor or the like. Stable detection by the sensor is desirable.

DETAILED DESCRIPTION

Figure 1:
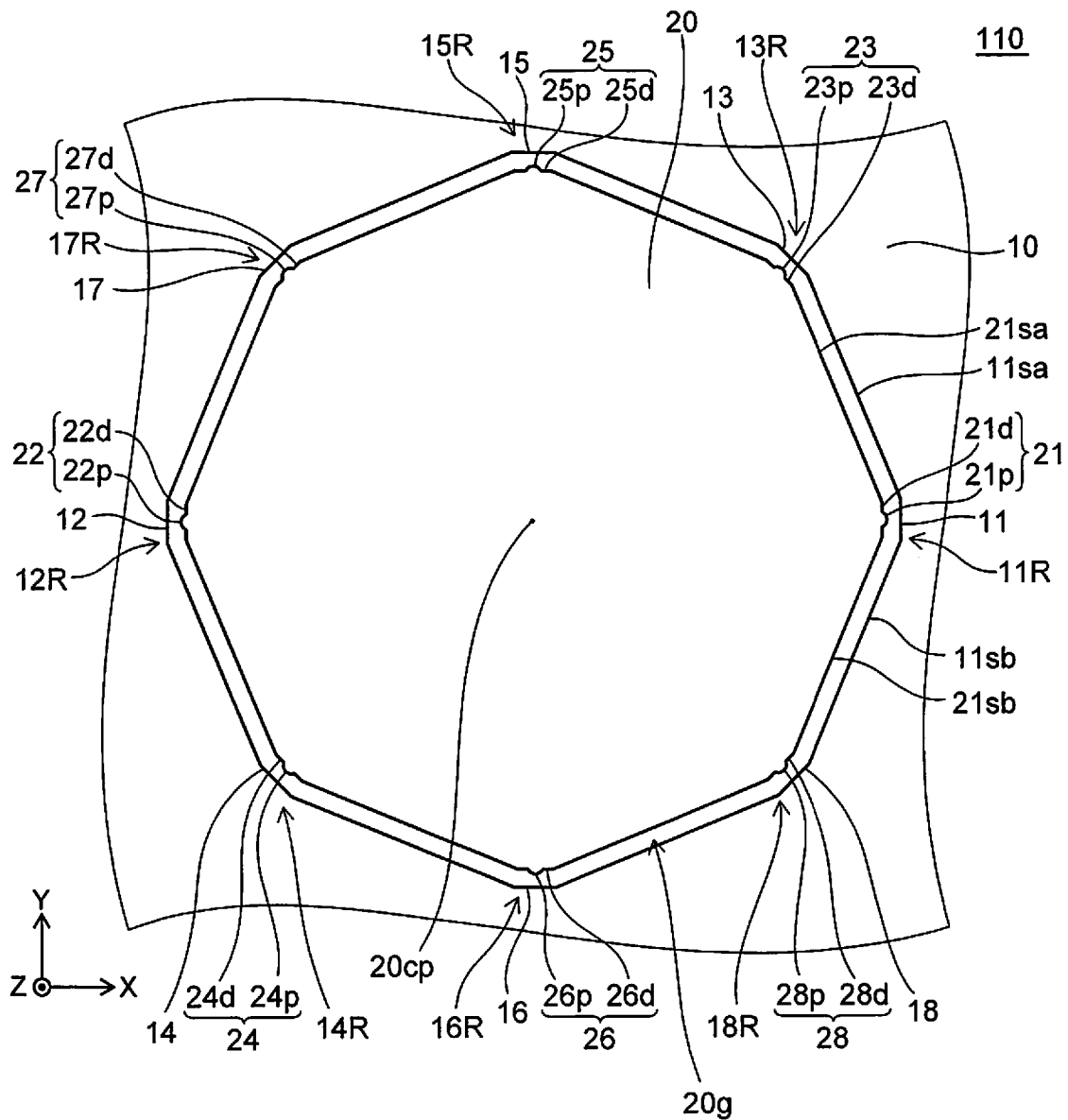
FIG. 1 is a schematic view illustrating a sensor according to a first embodiment.

According to one embodiment, a sensor includes a movable member including a first movable portion and a second movable portion, and a first fixed member. At least a portion of the first fixed member is between the first movable portion and the second movable portion. The first fixed member includes a first fixed counter portion opposing the first movable portion, and a second fixed counter portion opposing the second movable portion. The first fixed counter portion includes a first fixed protruding portion protruding toward the first movable portion. The second fixed counter portion includes a second fixed protruding portion protruding toward the second movable portion.

According to another embodiment, a sensor includes a movable member including a first movable portion and a second movable portion, and a first fixed member. At least a portion of the first fixed member is between the first movable portion and the second movable portion. The first fixed member includes a first fixed counter portion opposing the first movable portion, and a second fixed counter portion opposing the second movable portion. The first movable portion includes a first movable protruding portion protruding toward the first fixed counter portion. The second movable portion includes a second movable protruding portion protruding toward the second fixed counter portion.

According to another embodiment, a sensor includes a movable member including a first movable portion and a second movable portion, and a first fixed member. At least a portion of the first fixed member is between the first movable portion and the second movable portion. The first fixed member includes a first fixed counter portion opposing the first movable portion, and a second fixed counter portion opposing the second movable portion. The first fixed counter portion includes a first fixed protruding portion protruding toward the first movable portion. The second movable portion includes a second movable protruding portion protruding toward the second fixed counter portion.

According to another embodiment, a sensor includes a movable member including a first movable portion and a second movable portion, and a first fixed member. At least a portion of the first fixed member is between the first movable portion and the second movable portion. The first fixed member includes a first fixed counter portion opposing the first movable portion, and a second fixed counter portion opposing the second movable portion. The first movable portion includes a first movable protruding portion protruding toward the first fixed counter portion. The second fixed counter portion includes a second fixed protruding portion protruding toward the second movable portion.

Various embodiments are described below with reference to the accompanying drawings.

The drawings are schematic and conceptual; and the relationships between the thickness and width of portions, the proportions of sizes among portions, etc., are not necessarily the same as the actual values. The dimensions and proportions may be illustrated differently among drawings, even for identical portions.

In the specification and drawings, components similar to those described previously or illustrated in an antecedent drawing are marked with like reference numerals, and a detailed description is omitted as appropriate.

First Embodiment

FIG. 1 to FIG. 5 are schematic views illustrating a sensor according to a first embodiment.

Figure 2:
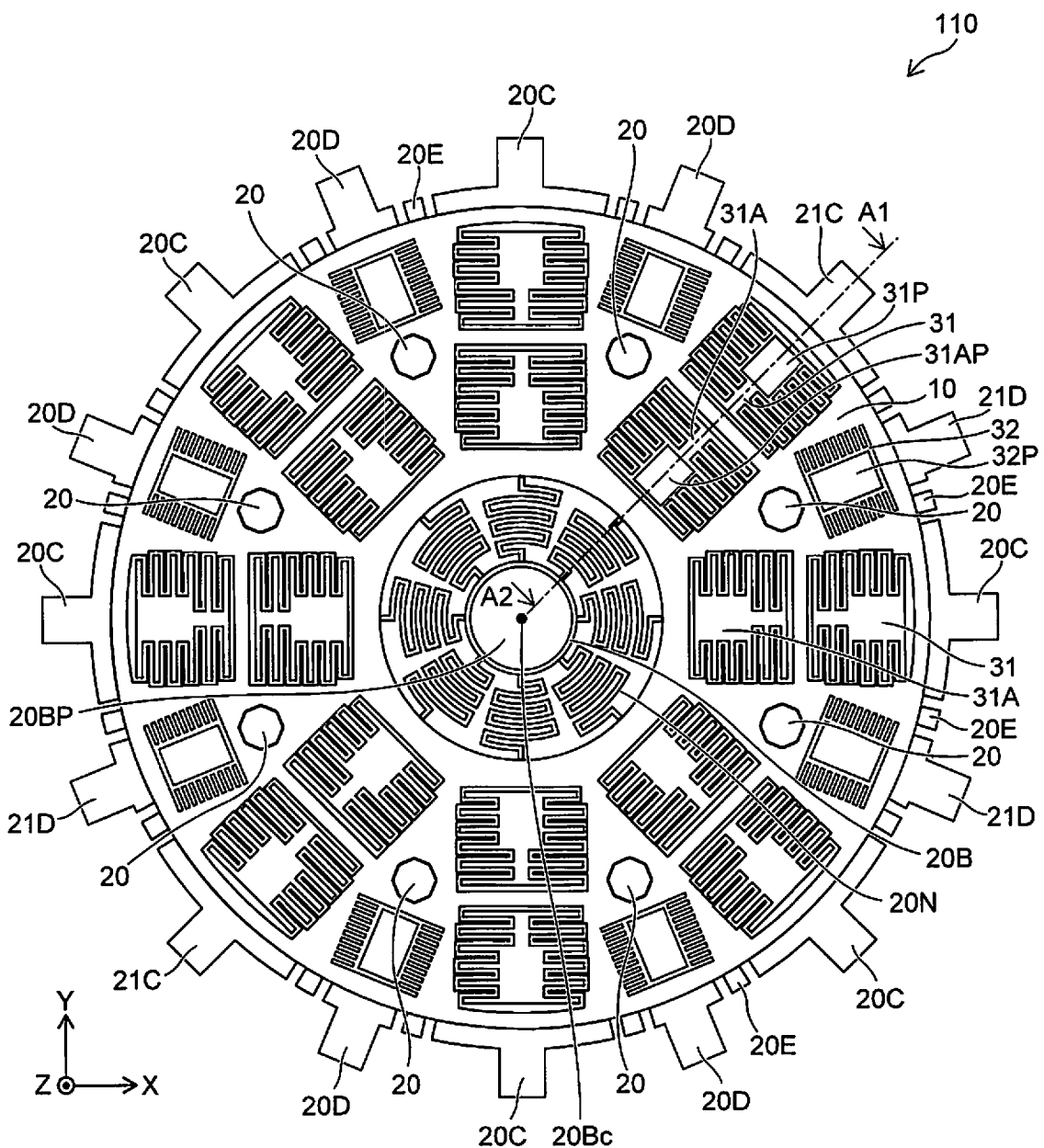
FIG. 2 is a schematic view illustrating the sensor according to the first embodiment.
Figure 3:
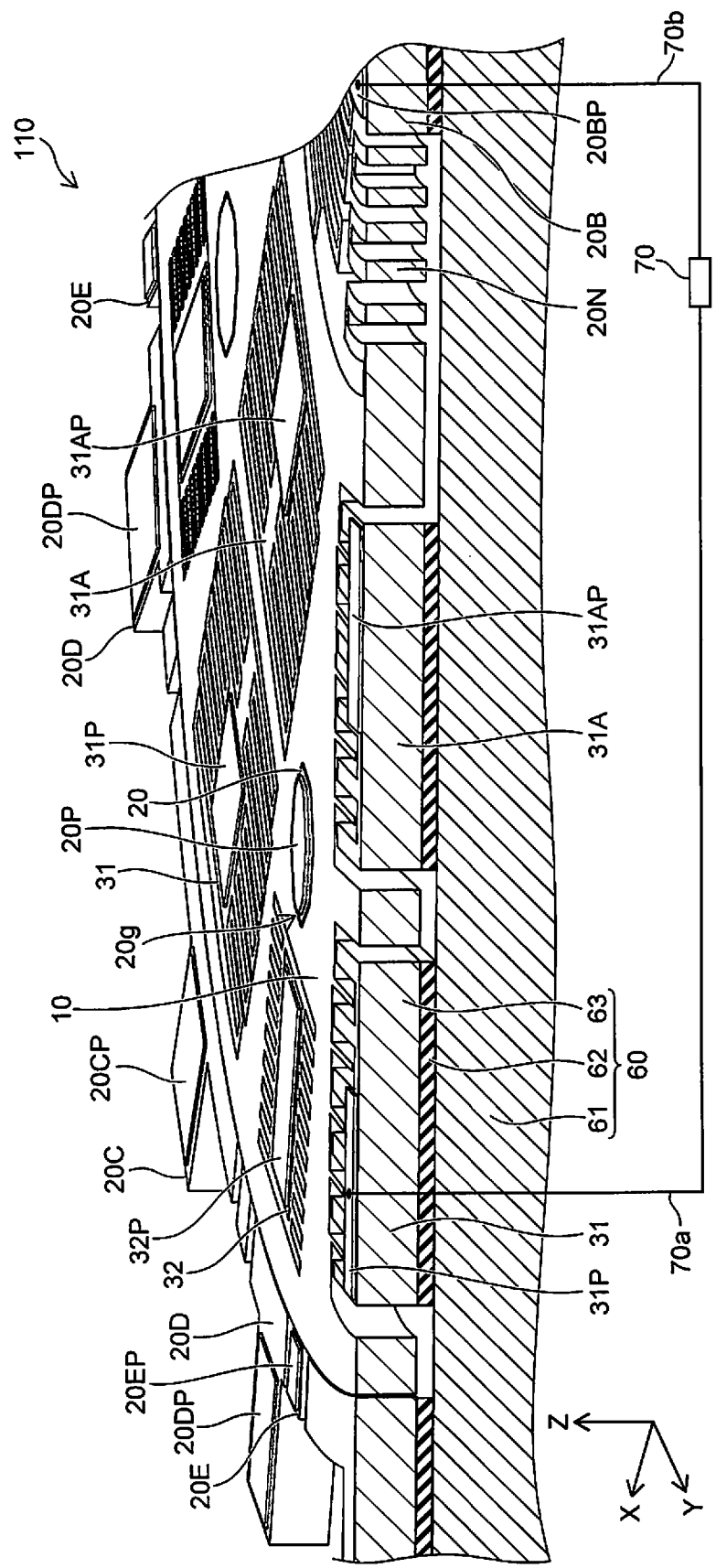
FIG. 3 is a schematic view illustrating the sensor according to the first embodiment.
Figure 4:
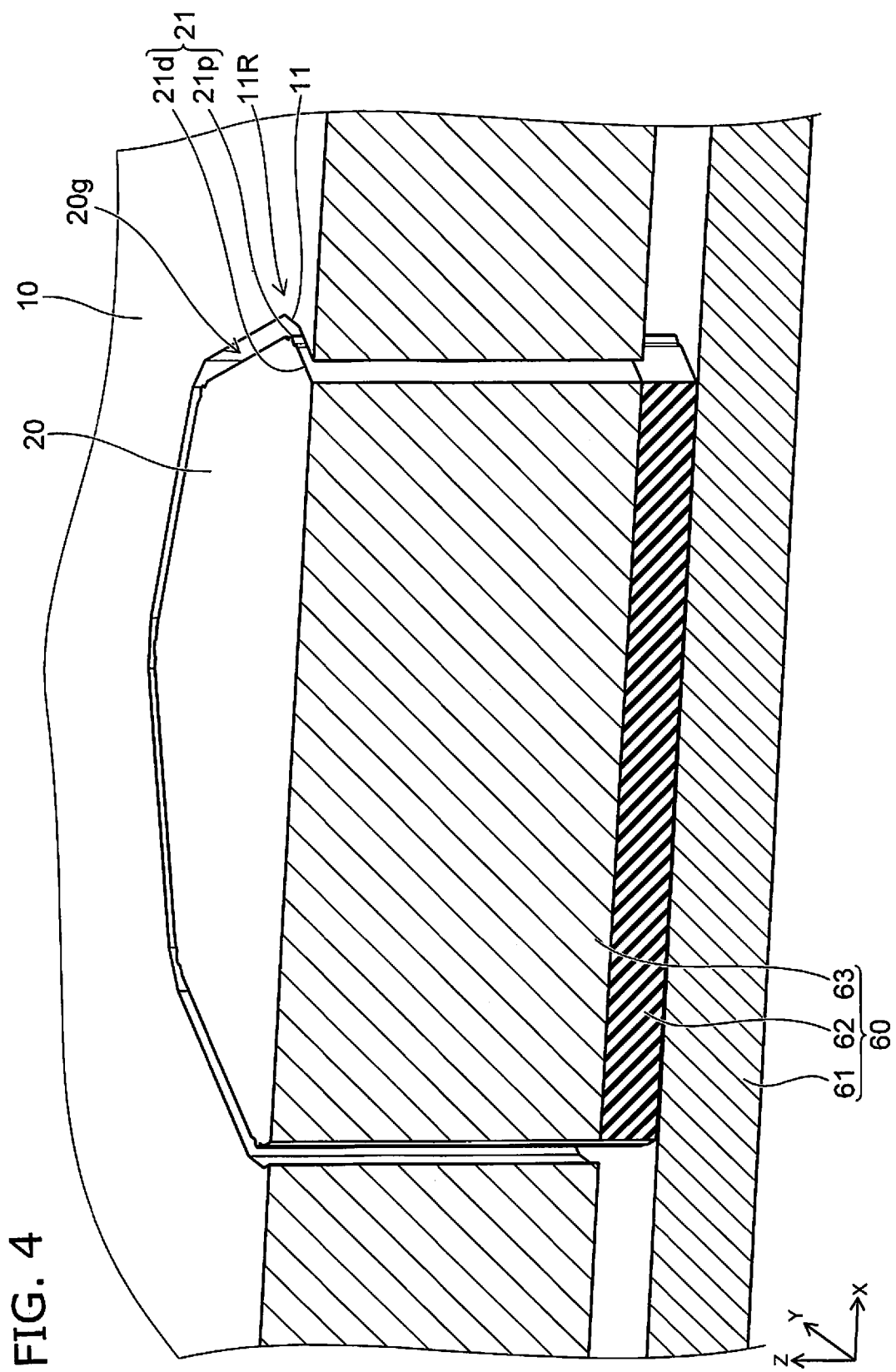
FIG. 4 is a schematic view illustrating the sensor according to the first embodiment.
Figure 5:
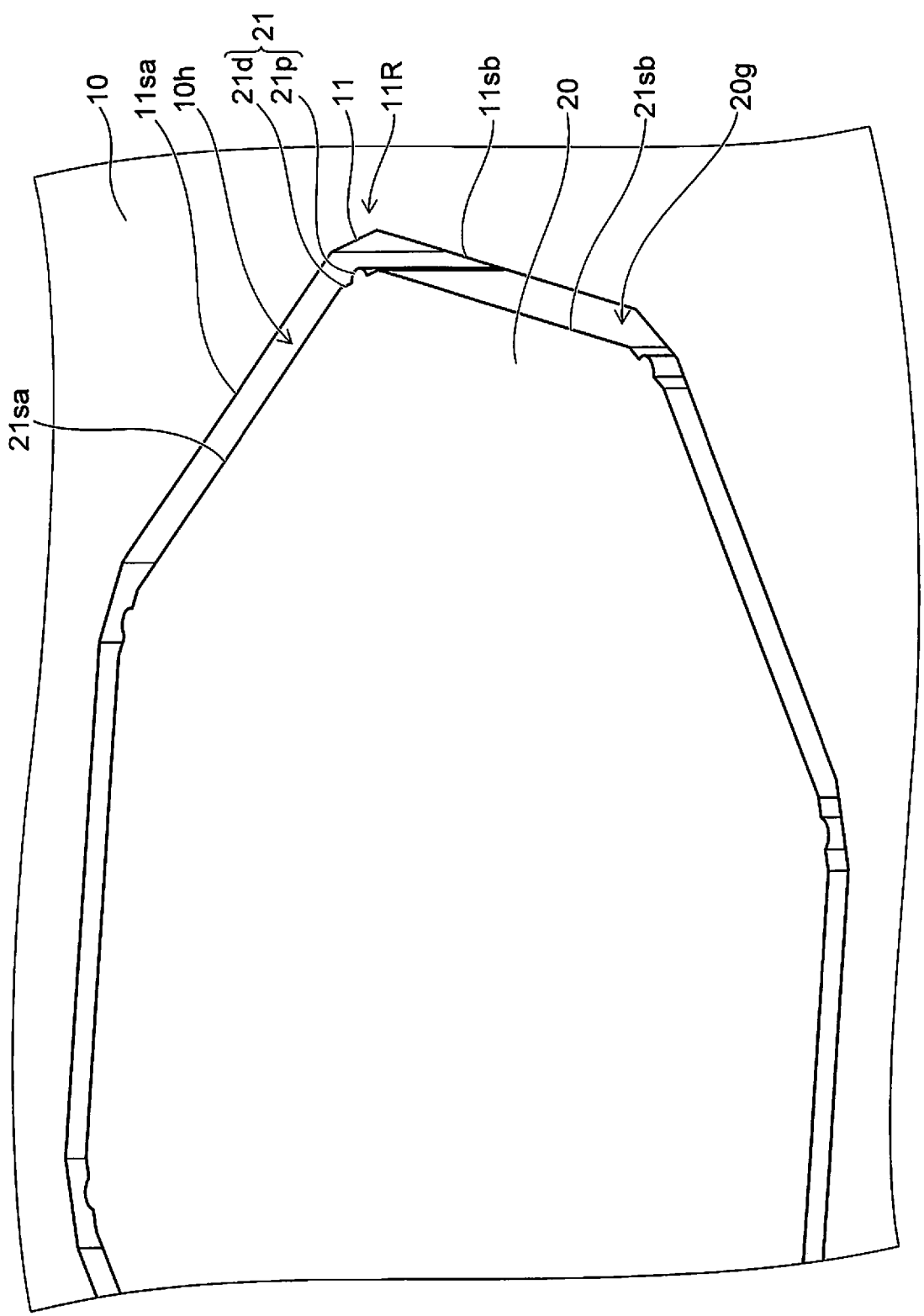
FIG. 5 is a schematic view illustrating the sensor according to the first embodiment.

FIG. 2 is a plan view of the sensor 110 according to the embodiment. FIG. 1 is a plan view showing an enlarged portion of the sensor 110. FIG. 3 is a perspective view including a line A1-A2 cross section of FIG. 2. FIG. 4 is a perspective view including a cross section of a portion of the sensor 110. FIG. 5 is a perspective view showing an enlarged portion of the sensor 110.

As shown in FIG. 2, the sensor 110 includes a movable member 10 and a first fixed member 20. As described below, the first fixed member 20 is fixed to a base body. On the other hand, the movable member 10 is held by a connection member (a spring member or the like) to another fixed member fixed to the base body. For example, the movable member 10 moves when an acceleration (or a force) is applied to the sensor 110. In the sensor 110, a signal based on the movement of the movable member 10 is extracted.

Examples of configurations extracting the signal based on the movement of the movable member 10 are described below.

For example, the first fixed member 20 suppresses excessive movement of the movable member 10. The first fixed member 20 is, for example, a stopper. As shown in FIG. 1, FIG. 4, and FIG. 5, a gap 20g is provided between the first fixed member 20 and the movable member 10.

As shown in FIG. 1, the first fixed member 20 is provided between multiple regions (e.g., multiple portions) included in the movable member 10. The multiple regions (e.g., the multiple portions) that are included in the movable member 10 may be continuous with each other. For example, the movable member 10 includes a first movable portion 11 and a second movable portion 12. The first movable portion 11 is a portion of a first region 11R of the movable member 10. The second movable portion 12 is a portion of a second region 12R of the movable member 10.

The direction from the second movable portion 12 toward the first movable portion 11 is taken as an X-axis direction. A direction perpendicular to the X-axis direction is taken as a Y-axis, direction. A direction perpendicular to the X-axis direction and the Y-axis direction is taken as a Z-axis direction.

At least a portion of the first fixed member 20 is between the first movable portion 11 and the second movable portion 12. For example, the first fixed member 20 is provided inside the movable member 10. For example, the first fixed member 20 is provided inside a hole 10h of the movable member 10 (referring to FIG. 5).

There is a first reference example in which a stopper is provided around the movable member 10. In the first reference example, the excessive movement of the movable member 10 is suppressed by the stopper. However, in the first reference example, the size of the sensor becomes large due to the stopper provided around the movable member 10. Or, for the same size, it is difficult to provide a structure for stably obtaining the signal based on the movement of the movable member 10.

Conversely, in the embodiment, the first fixed member 20 is provided between the multiple regions (e.g., the multiple portions) included in the movable member 10. Thereby, the size of the sensor can be small. Or, for the same size, it is easy to provide a structure for more stably obtaining the signal based on the movement of the movable member 10. According to the embodiment, a sensor can be provided in which stable detection is possible.

As shown in FIG. 1, the first fixed member 20 includes portions opposing the movable member 10. The first fixed member 20 includes a first fixed counter portion 21 and a second fixed counter portion 22. The first fixed counter portion 21 opposes the first movable portion 11. The second fixed counter portion 22 opposes the second movable portion 12. These counter portions oppose the movable member 10 in the X-Y plane. The first fixed counter portion 21 includes a first fixed protruding portion 21p protruding toward the first movable portion 11. The second fixed counter portion 22 includes a second fixed protruding portion 22p protruding toward the second movable portion 12.

For example, a portion (e.g., a central portion 20cp) of the first fixed member 20 is between the first movable portion 11 and the second movable portion 12. For example, the portion (e.g., the central portion 20cp) of the first fixed member 20 is between the first fixed counter portion 21 and the second fixed counter portion 22. The first fixed counter portion 21 and the second fixed counter portion 22 are on a diagonal line of the first fixed member 20. In the example, the diagonal line is aligned with the X-axis direction. For example, the protruding portions are provided respectively at the two portions on the diagonal line. The first fixed protruding portion 21p and the second fixed protruding portion 22p respectively oppose the first movable portion 11 and the second movable portion 12.

By providing the protruding portions respectively at the two portions on the diagonal line, the protruding portions of the first fixed member 20 contact the movable member 10 when the movable member 10 moves excessively.

On the other hand, in the case where the protruding portions are not provided, the fixed member and the movable member 10 have surface contact when the movable member 10 moves excessively. Therefore, there are cases where the surface of the fixed member and the surface of the movable member 10 closely adhere and do not separate easily. Therefore, there are cases where a sufficiently stable detection is difficult.

Conversely, in the embodiment, the protruding portions are provided respectively at the two portions on the diagonal line. Because the protruding portions of the first fixed member 20 contact the movable member 10, the protruding portions are separated easily from the movable member 10. Thereby, it is easier to maintain a more stable detection.

As shown in FIG. 1, the first fixed counter portion 21 includes a first fixed non-protruding portion 21d other than the first fixed protruding portion 21p. For example, the curvature of the first fixed non-protruding portion 21d is less than the curvature of the first fixed protruding portion 21p. For example, the curvature radius of the first fixed non-protruding portion 21d is larger than the curvature radius of the first fixed protruding portion 21p. For example, the first fixed non-protruding portion 21d is substantially a plane. On the other hand, at least a portion of the first movable portion 11 has a substantially planar configuration.

For example, the second fixed counter portion 22 includes a second fixed non-protruding portion 22d other than the second fixed protruding portion 22p. For example, the curvature of the second fixed non-protruding portion 22d is less than the curvature of the second fixed protruding portion 22p. For example, the curvature radius of the second fixed non-protruding portion 22d is larger than the curvature radius of the second fixed protruding portion 22p. For example, the second fixed non-protruding portion 22d is substantially a plane. On the other hand, at least a portion of the second movable portion 12 has a substantially planar configuration.

The first fixed counter portion 21 includes a portion opposing the first movable portion 11. In one example, the portion of the first fixed counter portion 21 opposing the first movable portion 11 may have a curved configuration. In another example, at least a portion of the first fixed counter portion 21 opposing the first movable portion 11 may have a planar configuration.

A plurality of two portions (pairs) that include such protruding portions may be provided. For example, as shown in FIG. 1, the movable member 10 further includes a third movable portion 13 and a fourth movable portion 14. The third movable portion 13 is included in a third region 13R of the movable member 10. The fourth movable portion 14 is included in a fourth region 14R of the movable member 10. The direction from the fourth movable portion 14 toward the third movable portion 13 crosses the direction (the X-axis direction) from the second movable portion 12 toward the first movable portion 11. In the example, the direction from the fourth movable portion 14 toward the third movable portion 13 is oblique to the X-axis direction.

The direction from the fourth movable portion 14 toward the third movable portion 13 may be perpendicular to the X-axis direction.

The first fixed member 20 includes a third fixed counter portion 23 opposing the third movable portion 13, and a fourth fixed counter portion 24 opposing the fourth movable portion 14. The third fixed counter portion 23 includes a third fixed protruding portion 23p protruding toward the third movable portion 13. The fourth fixed counter portion 24 includes a fourth fixed protruding portion 24p protruding toward the fourth movable portion 14.

The third fixed counter portion 23 includes a third fixed non-protruding portion 23d other than the third fixed protruding portion 23p. For example, the curvature of the third fixed non-protruding portion 23d is less than the curvature of the third fixed protruding portion 23p. For example, the third fixed non-protruding portion 23d is substantially a plane. On the other hand, at least a portion of the third movable portion 13 has a substantially planar configuration.

The fourth fixed counter portion 24 includes a fourth fixed non-protruding portion 24d other than the fourth fixed protruding portion 24p. For example, the curvature of the fourth fixed non-protruding portion 24d is less than the curvature of the fourth fixed protruding portion 24p. For example, the fourth fixed non-protruding portion 24d is substantially a plane. On the other hand, at least a portion of the fourth movable portion 14 has a substantially planar configuration.

As shown in FIG. 1, the movable member 10 may further include a fifth movable portion 15 and a sixth movable portion 16. The fifth movable portion 15 is included in a fifth region 15R of the movable member 10. The sixth movable portion 16 is included in a sixth region 16R of the movable member 10. The direction from the sixth movable portion 16 toward the fifth movable portion 15 crosses the X-axis direction. In the example, the direction from the sixth movable portion 16 toward the fifth movable portion 15 is substantially perpendicular to the X-axis direction.

The first fixed member 20 includes a fifth fixed counter portion 25 opposing the fifth movable portion 15, and a sixth fixed counter portion 26 opposing the sixth movable portion 16. The fifth fixed counter portion 25 includes a fifth fixed protruding portion 25p protruding toward the fifth movable portion 15. The sixth fixed counter portion 26 includes a sixth fixed protruding portion 26p protruding toward the sixth movable portion 16.

The fifth fixed counter portion 25 includes a fifth fixed non-protruding portion 25d other than the fifth fixed protruding portion 25p. For example, the curvature of the fifth fixed non-protruding portion 25d is less than the curvature of the fifth fixed protruding portion 25p. For example, the fifth fixed non-protruding portion 25d is substantially a plane. On the other hand, at least a portion of the fifth movable portion 15 has a substantially planar configuration.

The sixth fixed counter portion 26 includes a sixth fixed non-protruding portion 26d other than the sixth fixed protruding portion 26p. For example, the curvature of the sixth fixed non-protruding portion 26d is less than the curvature of the sixth fixed protruding portion 26p. For example, the sixth fixed non-protruding portion 26d is substantially a plane. On the other hand, at least a portion of the sixth movable portion 16 has a substantially planar configuration.

In the embodiment, the planar configuration (the configuration in the X-Y plane) of the first fixed member 20 is, for example, substantially polygonal. The planar configuration may be circular. For example, the protruding portions of the first fixed member 20 are provided at the corner portions of the planar configuration of the first fixed member 20.

The hole 10h of the movable member 10 (referring to FIG. 5) is provided substantially along the planar configuration (the planar configuration other than the protruding portions) of the first fixed member 20.

As shown in FIG. 1, side portions are provided at the two sides of the movable portion (e.g., the first movable portion 11). For example, the movable member 10 includes a first movable side portion 11sa and a second movable side portion 11sb. The first movable portion 11 is connected to the first movable side portion 11sa and the second movable side portion 11sb between the first movable side portion 11sa and the second movable side portion 11sb. On the other hand, the first fixed member 20 includes a first fixed counter side portion 21sa and a second fixed counter side portion 21sb. The first fixed counter side portion 21sa opposes the first movable side portion 11sa and is provided along the first movable side portion 11sa. The second fixed counter side portion 21sb opposes the second movable side portion 11sb and is provided along the second movable side portion 11sb.

As shown in FIG. 5, for example, the plane that includes the first movable side portion 11sa crosses the plane including the first movable portion 11. As shown in FIG. 5, the plane that includes the second movable side portion 11sb crosses the plane including the first movable portion 11.

In the example of the sensor 110, the plane that includes the first movable side portion 11sa is oblique to the plane including the first movable portion 11. The plane that includes the second movable side portion 11sb is oblique to the plane including the first movable portion 11.

As shown in FIG. 1, for example, the lengths of the first movable side portion 11sa and the second movable side portion 11sb in the X-Y plane each are longer than the length of the first movable portion 11. The first movable portion 11 is, for example, a corner portion.

An example of the holding state of the movable member 10 will now be described.

As shown in FIG. 2 and FIG. 3, the sensor 110 includes a base body 61, a second fixed member 20B, and a connection portion 20N. The second fixed member 20B is fixed to the base body 61. As described above, the first fixed member 20 also is fixed to the base body 61 (referring to FIG. 4). The direction from the base body 61 toward the second fixed member 20B is aligned with the Z-axis direction (referring to FIG. 3). The direction from the base body 61 toward the first fixed member 20 is aligned with the Z-axis direction (referring to FIG. 4). As shown in FIG. 3 and FIG. 4, an insulating film is provided between the base body 61 and the second fixed member 20B and between the base body 61 and the first fixed member 20. A conductive layer 63 that is provided on an insulating layer 62 is used as the first fixed member 20 and the second fixed member 20B.

The base body 61 is, for example, a silicon substrate. The insulating layer 62 is, for example, a silicon oxide film. The conductive layer 63 is, for example, silicon including an impurity. The descriptions relating to these materials are examples; and these materials may be other materials in the embodiment. A stacked body 60 that includes the base body 61, the insulating layer 62, and the conductive layer 63 is, for example, an SOI substrate.

The connection portion 20N connects the second fixed member 20B and the movable member 10 (referring to FIG. 2). The connection portion 20N holds the movable member 10. The conductive layer 63 recited above is provided as the movable member 10. The portion on the base body 61 where the insulating layer 62 is removed is used as the movable member 10 (referring to FIG. 3). A gap is provided between the movable member 10 and the base body 61.

The connection portion 20N is, for example, an elastic structure body. The distance (the distance along the direction from the second fixed member 20B toward the movable member 10) between the second fixed member 20B and the movable member 10 is changeable. In the example, the connection portion 20N has a meandering structure.

As shown in FIG. 2, multiple first fixed members 20 are provided in the example. The multiple first fixed members 20 are provided on a circumference having the second fixed member 20B at the center. The multiple first fixed members 20 are provided around the second fixed member 20B in a plane (the X-Y plane) crossing the direction (the Z-axis direction) from the base body 61 toward the second fixed member 20B. The movable member 10 is provided around the multiple first fixed members 20 in the plane. For example, the second fixed member 20B is between one of the multiple first fixed members 20 and another one of the multiple first fixed members 20. For example, the second fixed member 20B is at substantially the center of the circle where the multiple first fixed members 20 are provided. For example, the multiple first fixed members 20 are provided at substantially point-symmetric positions having a central portion 20Bc of the second fixed member 20B at the center (referring to FIG. 2).

Protruding portions such as the first fixed protruding portion 21p recited above may be further provided. As shown in FIG. 1, the fifth to eighth movable portions 15 to 18 respectively are portions of the fifth to eighth regions 15R to 18R. The fifth to eighth fixed counter portions 25 to 28 respectively oppose the fifth to eighth movable portions 15 to 18. The fifth to eighth fixed counter portions 25 to 28 respectively include the fifth to eighth fixed protruding portions 25p to 28p. The fifth to eighth fixed protruding portions 25p to 28p respectively oppose the fifth to eighth movable portions 15 to 18. The fifth to eighth fixed counter portions 25 to 28 include the fifth to eighth fixed non-protruding portions 25d to 28d other than the fifth to eighth fixed protruding portions 25p to 28p.

An example of a configuration for extracting the signal based on the movement of the movable member 10 will now be described.

As shown in FIG. 2 and FIG. 3, the sensor 110 includes a first structure body 31 and a controller 70. The first structure body 31 is fixed to the base body 61 (referring to FIG. 3). The first structure body 31 and the movable member 10 oppose each other in a comb teeth configuration. Examples of the structure of the comb teeth configuration are described below.

The controller 70 is electrically connected to the first structure body 31 and the movable member 10 (referring to FIG. 3). In the example, an electrode pad 20BP is provided at the second fixed member 20B. The movable member 10 is electrically connected to the electrode pad 20BP via the connection portion 20N and the second fixed member 20B. For example, the controller 70 is electrically connected to the electrode pad 20BP via an interconnect 70b. On the other hand, an electrode pad 31P is provided at the first structure body 31. For example, the controller 70 is electrically connected to the electrode pad 31P via an interconnect 70a.

The controller 70 generates a vibration of the movable member 10 referenced to the first structure body 31. For example, the controller 70 applies an alternating current voltage between the interconnect 70a and the interconnect 70b. An electrostatic force that corresponds to the alternating current voltage is applied to the first structure body 31 and the movable member 10. Thereby, the movable member 10 vibrates.

For example, the position (e.g., the relative position referenced to the first structure body 31) of the movable member 10 can be detected by detecting the capacitance between the movable member 10 and the first structure body 31 (the electrode). The position of the movable member 10 is the position in the comb-teeth direction of the movable member 10. For example, the first structure body 31 can be used for driving or for detecting.

The state of the vibration changes when an acceleration (or a force) is applied from the outside to the vibrating movable member 10. For example, the change of the state of the vibration is based on the Coriolis force. The external acceleration (or force) which is the detection object can be detected by detecting the change of the state of the vibration. The controller 70 outputs a signal corresponding to the change of the vibration when the acceleration (or the force) is applied to the movable member 10. The sensor 110 is, for example, a gyro sensor.

Multiple first structure bodies 31 are provided as shown in FIG. 2. For example, the multiple first structure bodies 31 are provided on a circumference having the second fixed member 20B at the center. For easier viewing of the drawing in FIG. 2, the electrode pad 31P is illustrated for a portion of the multiple first structure bodies 31; and the electrode pad 31P is not illustrated for another portion of the multiple first structure bodies 31. As shown in FIG. 2, other multiple first structure bodies 31A are provided in the example. For example, the multiple first structure bodies 31A are provided on a circumference having the second fixed member 20B at the center. For example, an electrode pad 31AP is provided at each of the multiple first structure bodies 31A. For easier viewing of the drawing in FIG. 2, the electrode pad 31AP is illustrated for a portion of the multiple first structure bodies 31A; and the electrode pad 31AP is not illustrated for another portion of the multiple first structure bodies 31A. The controller 70 is electrically connected to the first structure body 31A and the movable member 10. The controller 70 can apply a voltage (e.g., an alternating current voltage) between the first structure body 31A and the movable member 10. A vibration of the movable member 10 is generated by the voltage between the first structure body 31A and the movable member 10.

For example, the position of the movable member 10 can be detected by detecting the capacitance between the movable member 10 and the first structure body 31A. The first structure body 31A can be used for driving or for detecting. The movable member 10 can be caused to vibrate by a set including one or more of the multiple first structure bodies 31 and one or more of the multiple first structure bodies 31A. The movement of the movable member 10 can be detected by the set.

As shown in FIG. 2 and FIG. 3, multiple second structure bodies 32 are provided in the example. For example, the multiple second structure bodies 32 are provided on a circumference having the second fixed member 20B at the center. For example, an electrode pad 32P is provided at each of the multiple second structure bodies 32. For easier viewing of the drawing in FIG. 2, the electrode pad 32P is illustrated for a portion of the multiple second structure bodies 32; and the electrode pad 32P is not illustrated for another portion of the multiple second structure bodies 32.

The controller 70 is electrically connected to the second structure body 32 and the movable member 10. The controller 70 can apply a voltage between the second structure body 32 and the movable member 10. For example, the effective spring constant of the movable member 10 can be adjusted by the electrostatic force between the second structure body 32 and the movable member 10. For example, the asymmetry of the resonant frequency can be corrected by the second structure body 32.

The first structure body 31, the other first structure body 31A, and the second structure body 32 are provided inside the movable member 10. The movable member 10 is around the first structure body 31, the other first structure body 31A, and the second structure body 32.

For example, the multiple first structure bodies 31, the other multiple first structure bodies 31A, and the multiple second structure bodies 32 are provided respectively at substantially point-symmetric positions having the central portion 20Bc of the second fixed member 20B at the center (referring to FIG. 2).

The controller 70 may be electrically connected to the first fixed member 20. The potential of the first fixed member 20 may be controlled by the controller 70. For example, the potential of the first fixed member 20 may be substantially the same as the potential of the movable member 10. Stable characteristics are obtained more easily. As shown in FIG. 3, an electrode pad 20P may be provided at the first fixed member 20. The electrode pad 20P is not illustrated in FIG. 2. The electrical connection between the controller 70 and the first fixed member 20 may be performed by the electrode pad 20P.

Multiple third fixed members 20C may be provided as shown in FIG. 2 and FIG. 3. The multiple third fixed members 20C are fixed to the base body 61. The multiple third fixed members 20C are provided around the movable member 10 in the X-Y plane. The controller 70 may be electrically connected to the third fixed members 20C. The position of the movable member 10, the state of the vibration of the movable member 10, etc., may be controlled by the voltage applied to the third fixed members 20C. The position of the movable member 10 can be detected by detecting the capacitance between the movable member 10 and the third fixed members 20C. The electrical connection between the controller 70 and the third fixed members 20C may be performed by electrode pads 20CP (referring to FIG. 3).

Multiple fourth fixed members 20D may be further provided. The multiple fourth fixed members 20D are fixed to the base body 61. The multiple fourth fixed members 20D are provided around the movable member 10 in the X-Y plane. The controller 70 may be electrically connected to the fourth fixed members 20D. The position of the movable member 10, the state of the vibration of the movable member 10, etc., may be controlled by the voltage applied to the fourth fixed members 20D. The position of the movable member 10 can be detected by detecting the capacitance between the movable member 10 and the fourth fixed members 20D. The electrical connection between the controller 70 and the fourth fixed members 20D may be performed by electrode pads 20DP (referring to FIG. 3).

Multiple fifth fixed members 20E may be further provided. The multiple fifth fixed members 20E are fixed to the base body 61. The multiple fifth fixed members 20E are provided around the movable member 10 in the X-Y plane. The controller 70 may be electrically connected to the fifth fixed members 20E. The fifth fixed members 20E may function as stoppers. For example, a stable operation is possible. The electrical connection between the controller 70 and the fifth fixed members 20E may be performed by electrode pads 20EP (referring to FIG. 3).

For example, the multiple third to fifth fixed members 20C to 20E are provided respectively at substantially point-symmetric positions having the central portion 20Bc of the second fixed member 20B at the center (referring to FIG. 2).

An example of the structure of the comb teeth configuration of the first structure body 31 and the movable member 10 will now be described.

Figure 6A:
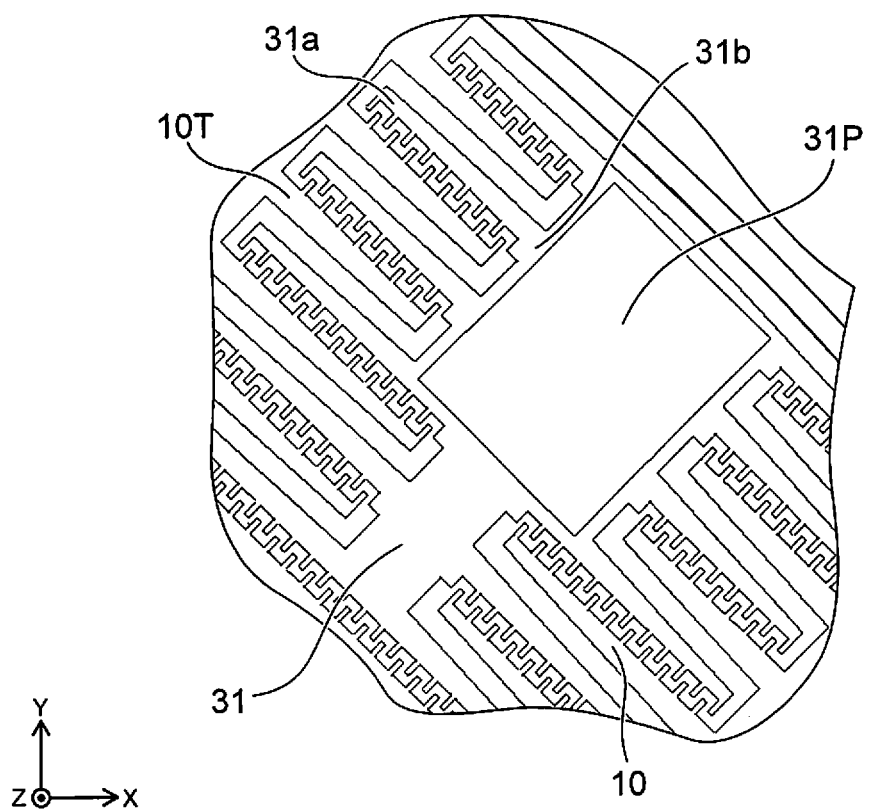
FIG. 6A and FIG. 6B are schematic plan views illustrating a portion of the sensor according to the first embodiment.
Figure 6B:
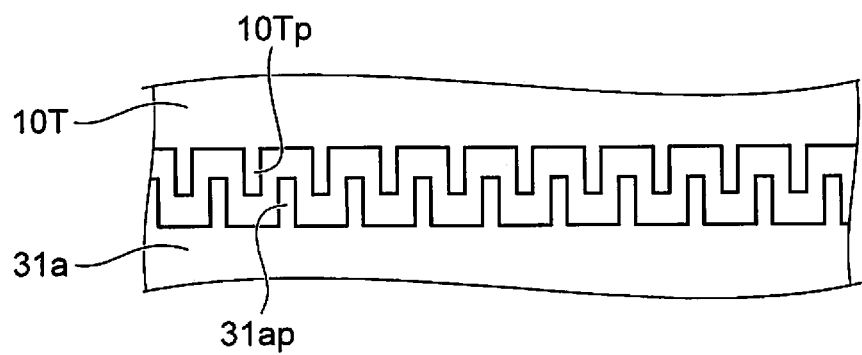

FIG. 6A and FIG. 6B are schematic plan views illustrating a portion of the sensor according to the first embodiment.

These drawings show an enlargement of the first structure body 31 and the movable member 10. As shown in FIG. 6A, the first structure body 31 includes multiple first structure portions 31a and a second structure portion 31b. The multiple first structure portions 31a are connected to the second structure portion 31b. The multiple first structure portions 31a each extend from the second structure portion 31b. The multiple first structure portions 31a are branch-like portions. The movable member 10 includes portions 10T opposing the multiple first structure portions 31a. The portions 10T are branch-like portions. The first structure portions 31a and the portions 10T are arranged alternately.

A portion of FIG. 6A is enlarged in FIG. 6B. As shown in FIG. 6B, the first structure portion 31a includes multiple extension portions 31ap. The multiple extension portions 31ap protrude from the first structure portion 31a. As shown in FIG. 6B, the portion 10T includes multiple extension portions 10Tp. The multiple extension portions 10Tp protrude from the portion 10T. The extension portions 31ap and the extension portions 10Tp are arranged alternately. The extension portions 31ap and the extension portions 10Tp oppose each other. The extension portions 31ap and the extension portions 10Tp are substantially parallel to each other.

An electrostatic force is applied between the first structure portion 31a including the extension portions 31ap and the portion 10T including the extension portions 10Tp when a voltage (e.g., an alternating current voltage) is applied between the first structure body 31 and the movable member 10. For example, the distance between the first structure portion 31a and the portion 10T changes periodically. The movable member 10 can be caused to vibrate by adjusting the voltage.

Second Embodiment

Figure 7:
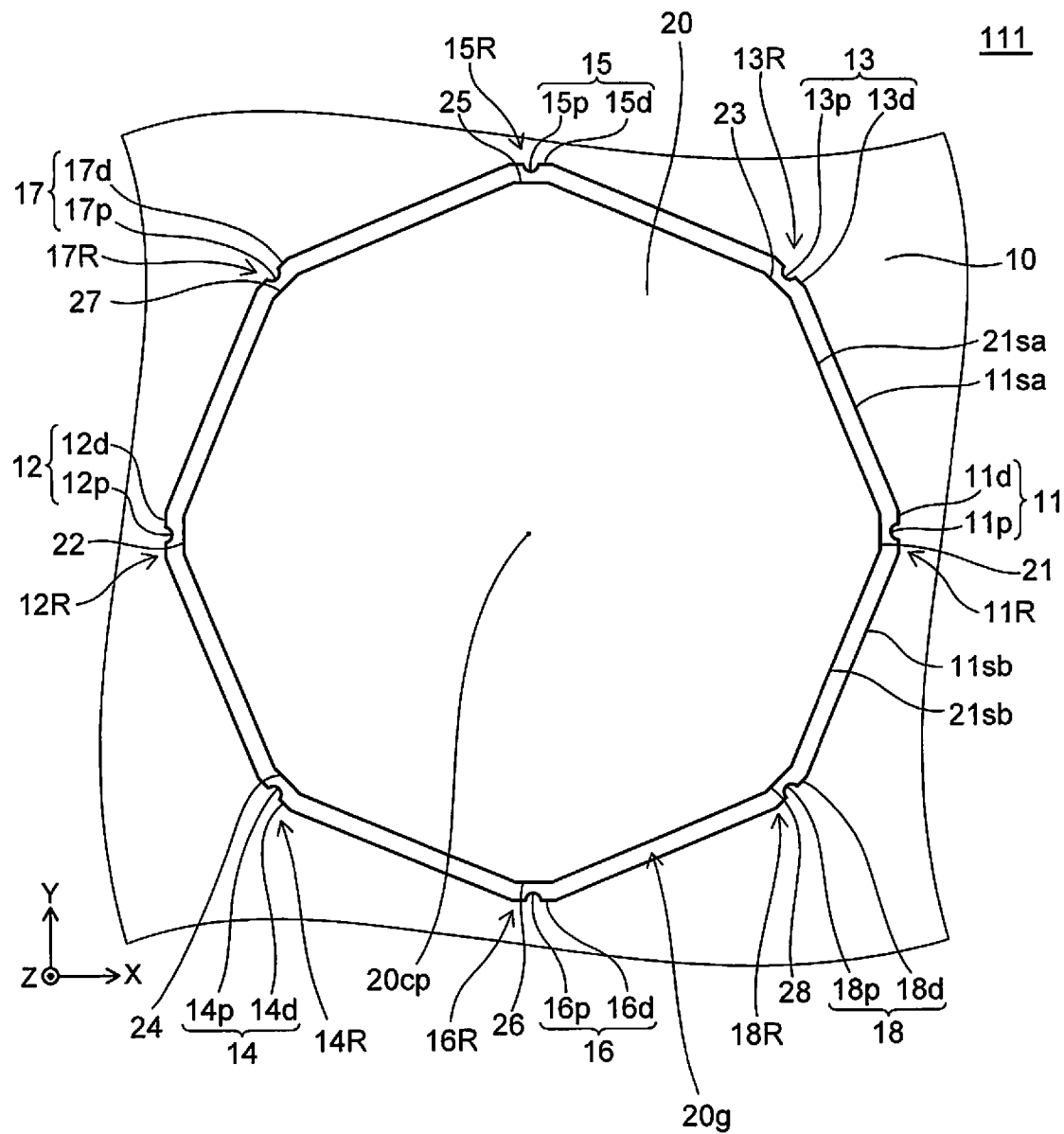
FIG. 7 is a schematic plan view illustrating a sensor according to a second embodiment.

FIG. 7 is a schematic plan view illustrating a sensor according to a second embodiment.

FIG. 7 illustrates an enlarged portion of the sensor 111 according to the embodiment. The sensor 111 also includes the movable member 10 and the first fixed member 20. The structures of the movable member 10 and the first fixed member 20 of the sensor 111 are different from those of the sensor 110. Otherwise, the configuration of the sensor 111 is the same as the configuration of the sensor 110; and a description is therefore omitted. In the sensor 111, protruding portions are provided in the movable member 10.

As shown in FIG. 7, the movable member 10 includes the first movable portion 11 and the second movable portion 12. At least a portion of the first fixed member 20 is between the first movable portion 11 and the second movable portion 12. The first fixed member 20 includes the first fixed counter portion 21 opposing the first movable portion 11, and the second fixed counter portion 22 opposing the second movable portion 12. The first movable portion 11 includes a first movable protruding portion 11p protruding toward the first fixed counter portion 21. The second movable portion 12 includes a second movable protruding portion 12p protruding toward the second fixed counter portion 22.

In the sensor 111 as well, the size of the sensor can be small. Or, for the same size, the signal based on the movement of the movable member 10 is obtained more stably. Because the protruding portions of the movable member 10 contact the first fixed member 20, the protruding portions are easily separated from the first fixed member 20. In the embodiment as well, it is easier to maintain a more stable detection.

As shown in FIG. 7, the first movable portion 11 includes a first movable non-protruding portion 11d other than the first movable protruding portion 11p. The curvature of the first movable non-protruding portion 11d is less than the curvature of the first movable protruding portion 11p. For example, the first movable non-protruding portion 11d is substantially a plane. At least a portion of the first fixed counter portion 21 has a substantially planar configuration.

Similarly, the second movable portion 12 includes a second movable non-protruding portion 12d other than the second movable protruding portion 12p. The curvature of the second movable non-protruding portion 12d is less than the curvature of the second movable protruding portion 12p. For example, the second movable non-protruding portion 12d is substantially a plane. At least a portion of the second fixed counter portion 22 has a substantially planar configuration.

Protruding portions having such configurations are provided also in the other movable portions. For example, the movable member 10 further includes the third movable portion 13 and the fourth movable portion 14. The direction from the fourth movable portion 14 toward the third movable portion 13 crosses the direction (in the example, the X-axis direction) from the second movable portion 12 toward the first movable portion 11.

The first fixed member 20 includes the third fixed counter portion 23 opposing the third movable portion 13, and the fourth fixed counter portion 24 opposing the fourth movable portion 14. The third movable portion 13 includes a third movable protruding portion 13p protruding toward the third fixed counter portion 23. The fourth movable portion 14 includes a fourth movable protruding portion 14p protruding toward the fourth fixed counter portion 24.

Similarly, the third movable portion 13 includes a third movable non-protruding portion 13d other than the third movable protruding portion 13p. The curvature of the third movable non-protruding portion 13d is less than the curvature of the third movable protruding portion 13p. The fourth movable portion 14 includes a fourth movable non-protruding portion 14d other than the fourth movable protruding portion 14p. The curvature of the fourth movable non-protruding portion 14d is less than the curvature of the fourth movable protruding portion 14p.

In the example, the direction from the fourth movable portion 14 toward the third movable portion 13 is oblique to the direction from the second movable portion 12 toward the first movable portion 11.

Such protruding portions may be further provided. As shown in FIG. 7, the fifth to eighth movable portions 15 to 18 respectively are portions of the fifth to eighth regions 15R to 18R. The fifth to eighth movable portions 15 to 18 respectively include fifth to eighth movable protruding portions 15p to 18p. The fifth to eighth movable protruding portions 15p to 18p respectively oppose the fifth to eighth fixed counter portions 25 to 28. The fifth to eighth movable portions 15 to 18 include fifth to eighth movable non-protruding portions 15d to 18d other than the fifth to eighth movable protruding portions 15p to 18p.

Third Embodiment

Figure 8:
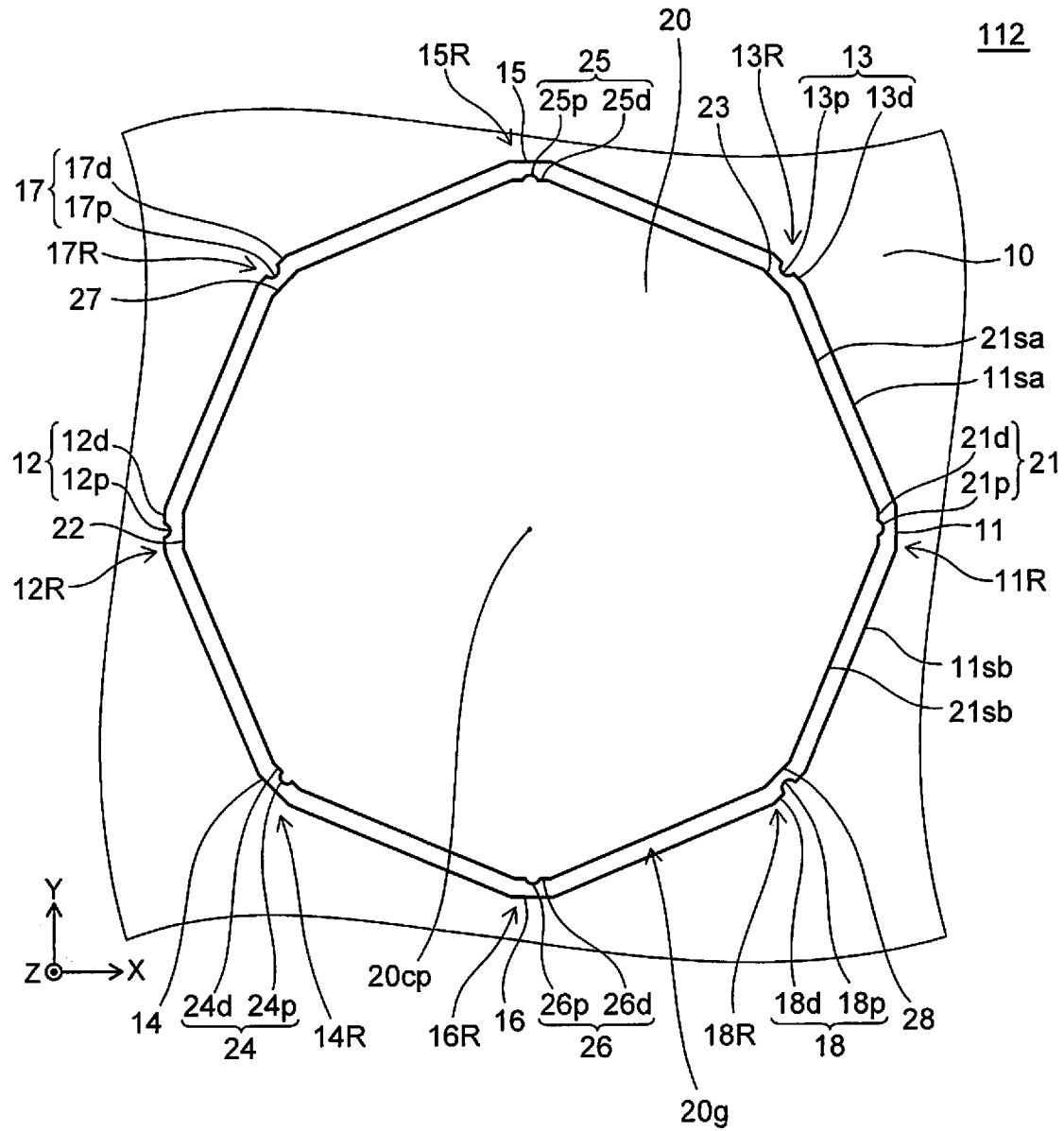
FIG. 8 is a schematic plan view illustrating a sensor according to a third embodiment.

FIG. 8 is a schematic plan view illustrating a sensor according to a third embodiment.

FIG. 8 illustrates an enlarged portion of the sensor 112 according to the embodiment. The sensor 112 also includes the movable member 10 and the first fixed member 20. The structures of the movable member 10 and the first fixed member 20 of the sensor 112 are different from those of the sensor 110. Otherwise, the configuration of the sensor 112 is the same as the configuration of the sensor 110; and a description is therefore omitted. In the sensor 112, protruding portions are provided in portions of the movable member 10; and protruding portions are provided in portions of the first fixed member 20.

In the sensor 112 as shown in FIG. 8, the movable member 10 includes the first movable portion 11 and the second movable portion 12. At least a portion of the first fixed member 20 is between the first movable portion 11 and the second movable portion 12. The first fixed member 20 includes the first fixed counter portion 21 opposing the first movable portion 11, and the second fixed counter portion 22 opposing the second movable portion 12.

In the sensor 112, the first fixed counter portion 21 includes the first fixed protruding portion 21p protruding toward the first movable portion 11. The second movable portion 12 includes the second movable protruding portion 12p protruding toward the second fixed counter portion 22.

Thus, a protruding portion may be provided in at least one of the movable portion or the fixed counter portion.

In the sensor 112 as well, the size of the sensor can be small. Or, for the same size, the signal based on the movement of the movable member 10 is obtained more stably. By providing the protruding portions, the movable member 10 and the first fixed member 20 are easily separated from each other. In the embodiment as well, it is easier to maintain a more stable detection.

In the sensor 112, the protruding portions may be provided in a portion of the movable member 10; and protruding portions may not be provided in a portion of the first fixed member 20. For example, at least a portion of the first fixed member 20 is between the third movable portion 13 and the fourth movable portion 14. The first fixed member 20 includes the third fixed counter portion 23 opposing the third movable portion 13, and the fourth fixed counter portion 24 opposing the fourth movable portion 14.

The third movable portion 13 includes the third movable protruding portion 13p protruding toward the third fixed counter portion 23. The fourth fixed counter portion 24 includes the fourth fixed protruding portion 24p protruding toward the fourth movable portion 14.

The third movable portion 13 may be the "first movable portion;" and the fourth fixed counter portion 24 may be the "second fixed counter portion." In such a case, the "first movable portion" includes the "first movable protruding portion" protruding toward the "first fixed counter portion." The "second fixed counter portion" includes the "second fixed protruding portion" protruding toward the "second movable portion."

Fourth Embodiment

Figure 9:
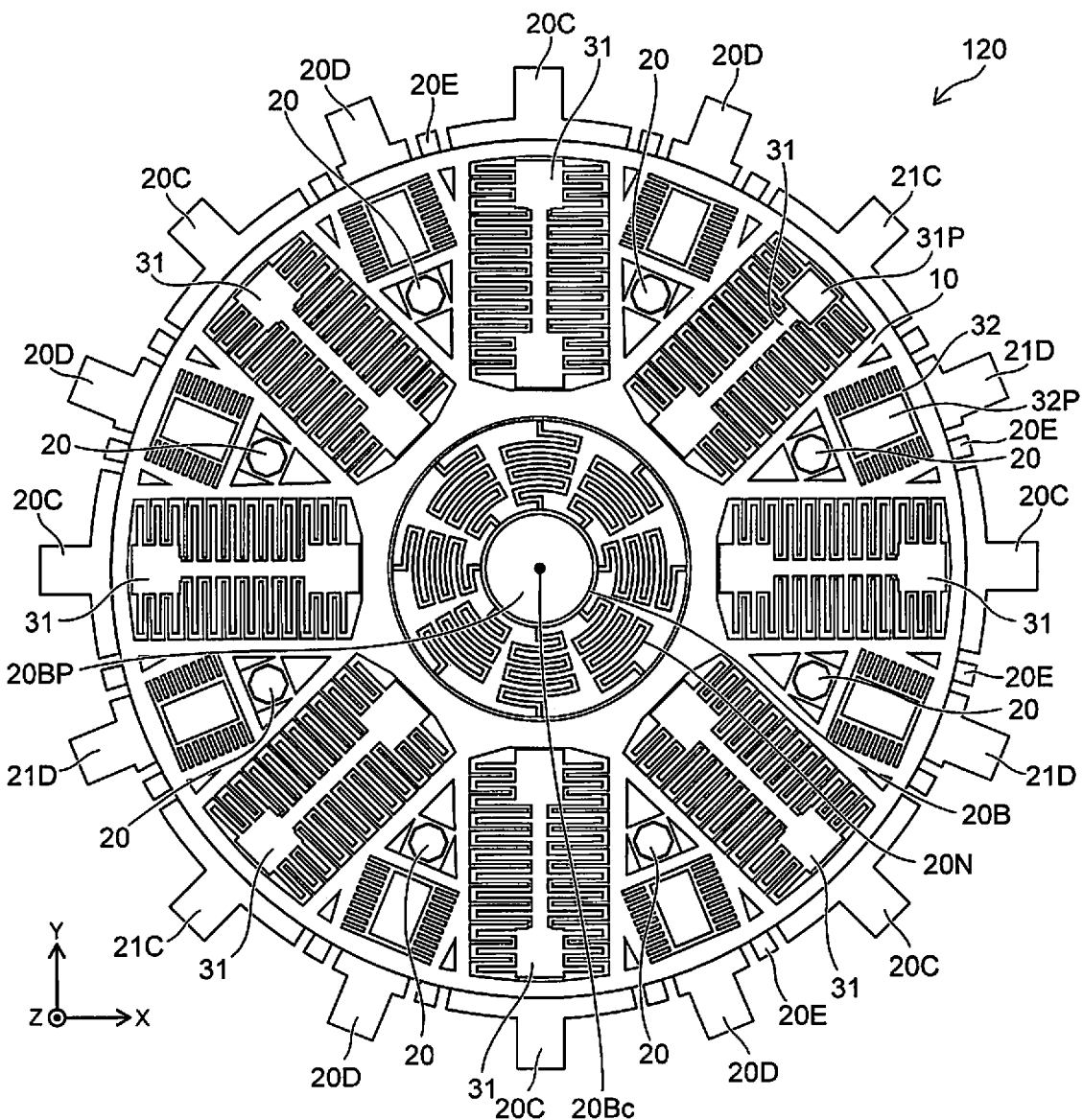
FIG. 9 is a schematic plan view illustrating a sensor according to a fourth embodiment.
Figure 10:
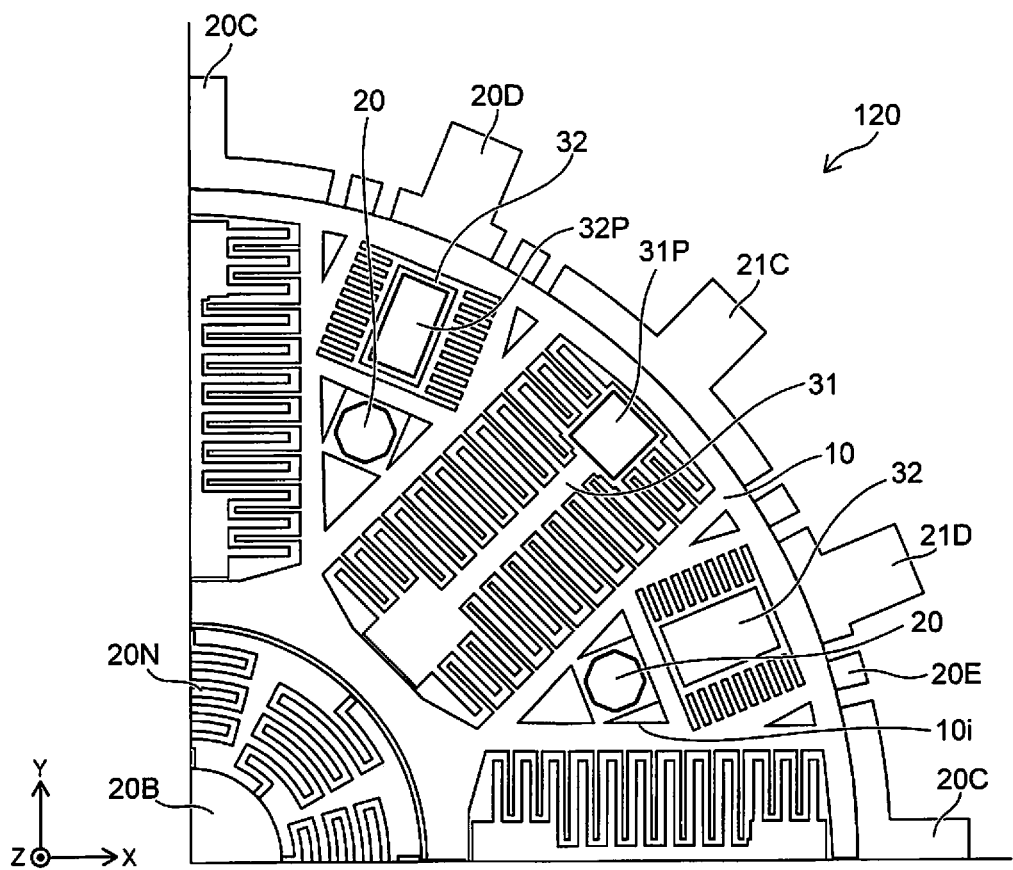
FIG. 10 is a schematic plan view illustrating the sensor according to the fourth embodiment.
Figure 11:
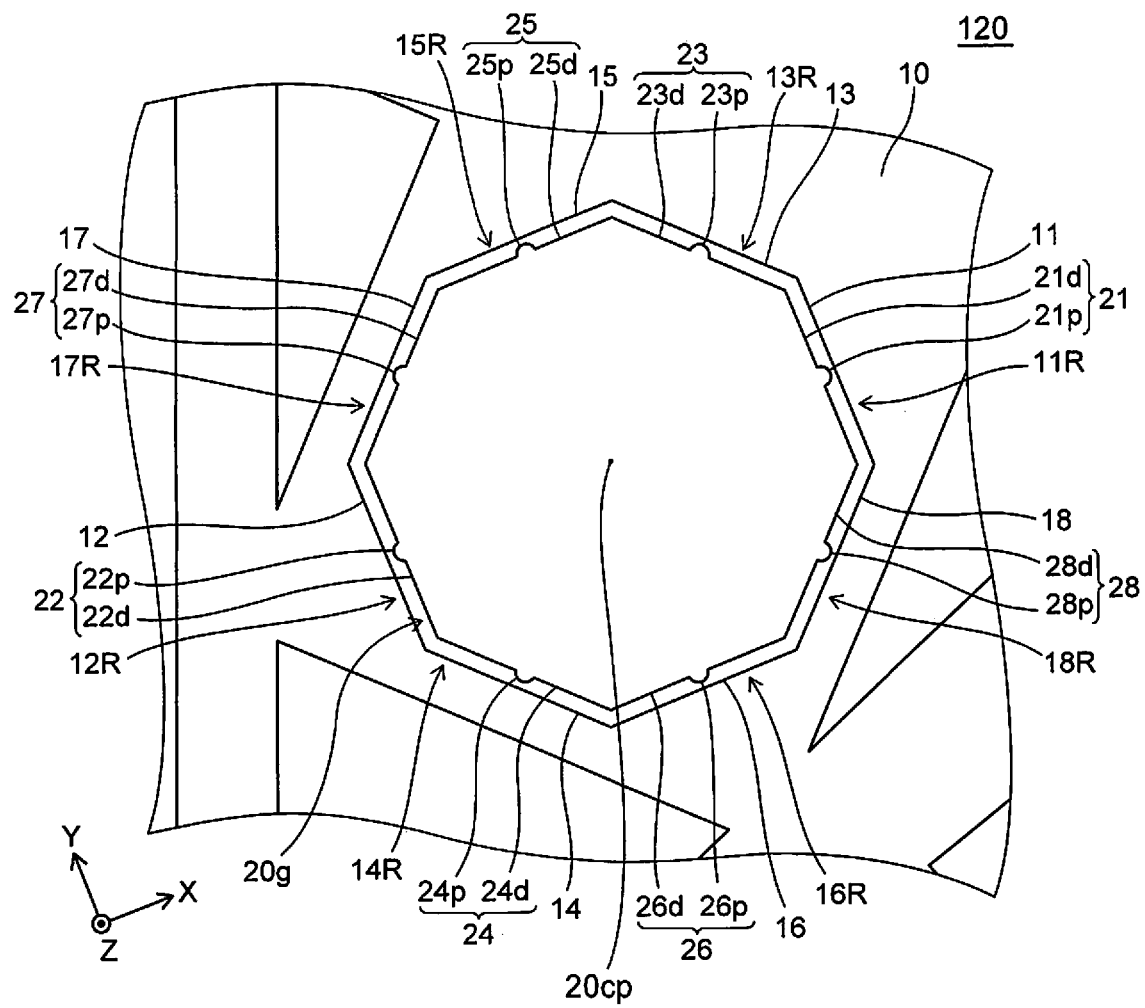
FIG. 11 is a schematic plan view illustrating the sensor according to the fourth embodiment.

FIG. 9 to FIG. 11 are schematic plan views illustrating a sensor according to a fourth embodiment.

FIG. 9 is a plan view of the sensor 120 according to the embodiment. FIG. 10 illustrates an enlarged portion of FIG. 9. FIG. 11 illustrates a further-enlarged portion of FIG. 10.

The sensor 120 also includes the movable member 10 and the first fixed member 20. The configuration of the first structure body 31 of the sensor 120 is different from the configuration of the first structure body 31 of the sensor 110. Otherwise, the configuration of the sensor 120 may be the same as the configuration of the sensor 110.

In the sensor 120 as well, the first to eighth movable portions 11 to 18 are provided in the movable member 10. The first to eighth fixed counter portions 21 to 28 are provided in the first fixed member 20. In the sensor 120, the first to eighth fixed protruding portions 21p to 28p are provided respectively in the first to eighth fixed counter portions 21 to 28. As shown in FIG. 10, a hole 10i (or a recess), etc., may be provided in the movable member 10.

Fifth Embodiment

Figure 12:
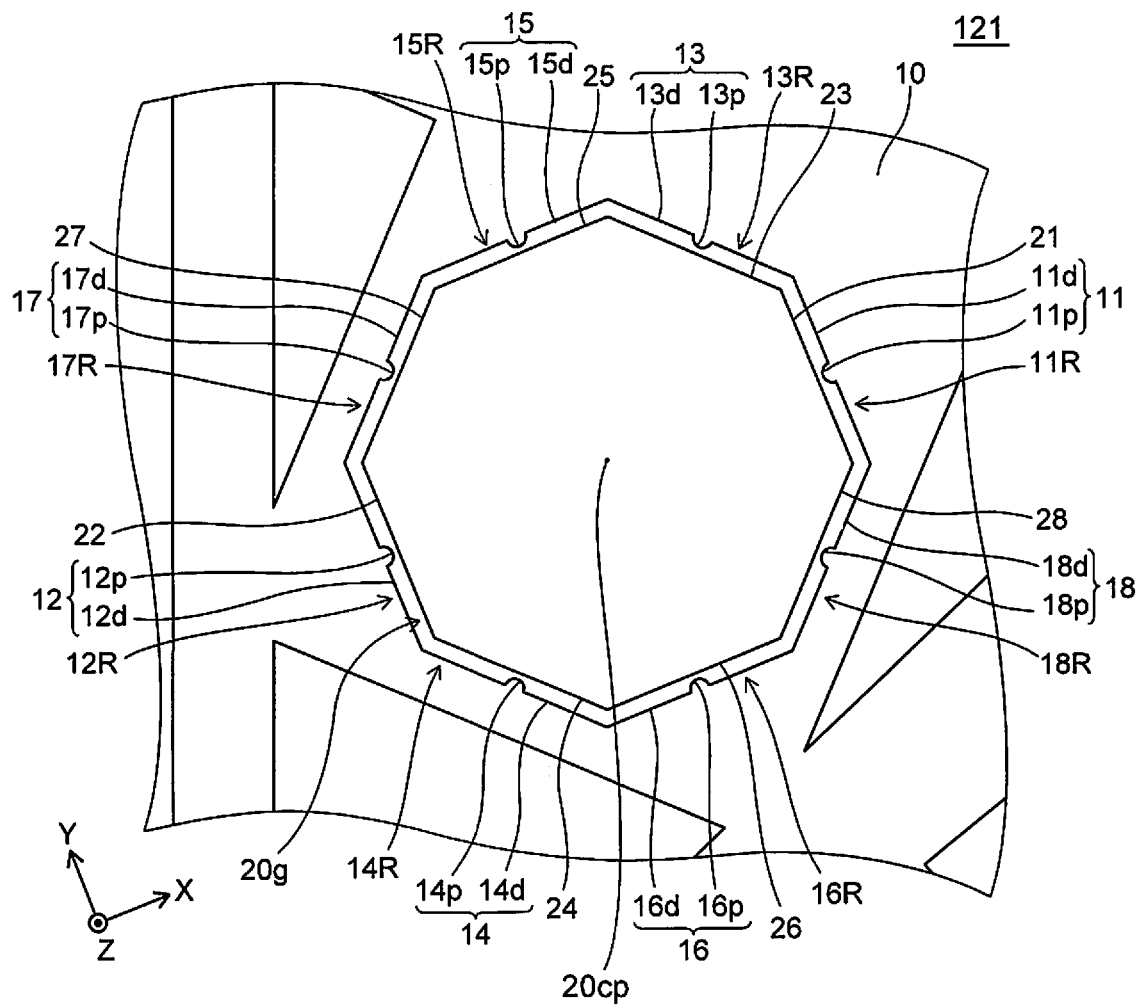
FIG. 12 is a schematic plan view illustrating a sensor according to a fifth embodiment.

FIG. 12 is a schematic plan view illustrating a sensor according to a fifth embodiment.

FIG. 12 illustrates an enlarged portion of the sensor 121 according to the embodiment. The sensor 121 also includes the movable member 10 and the first fixed member 20. The structures of the movable member 10 and the first fixed member 20 of the sensor 121 are different from those of the sensor 120. Otherwise, the configuration of the sensor 121 is the same as the configuration of the sensor 120. In the sensor 121, protruding portions (the first to eighth movable protruding portions 11p to 18p) are provided in the movable member 10.

Sixth Embodiment

Figure 13:
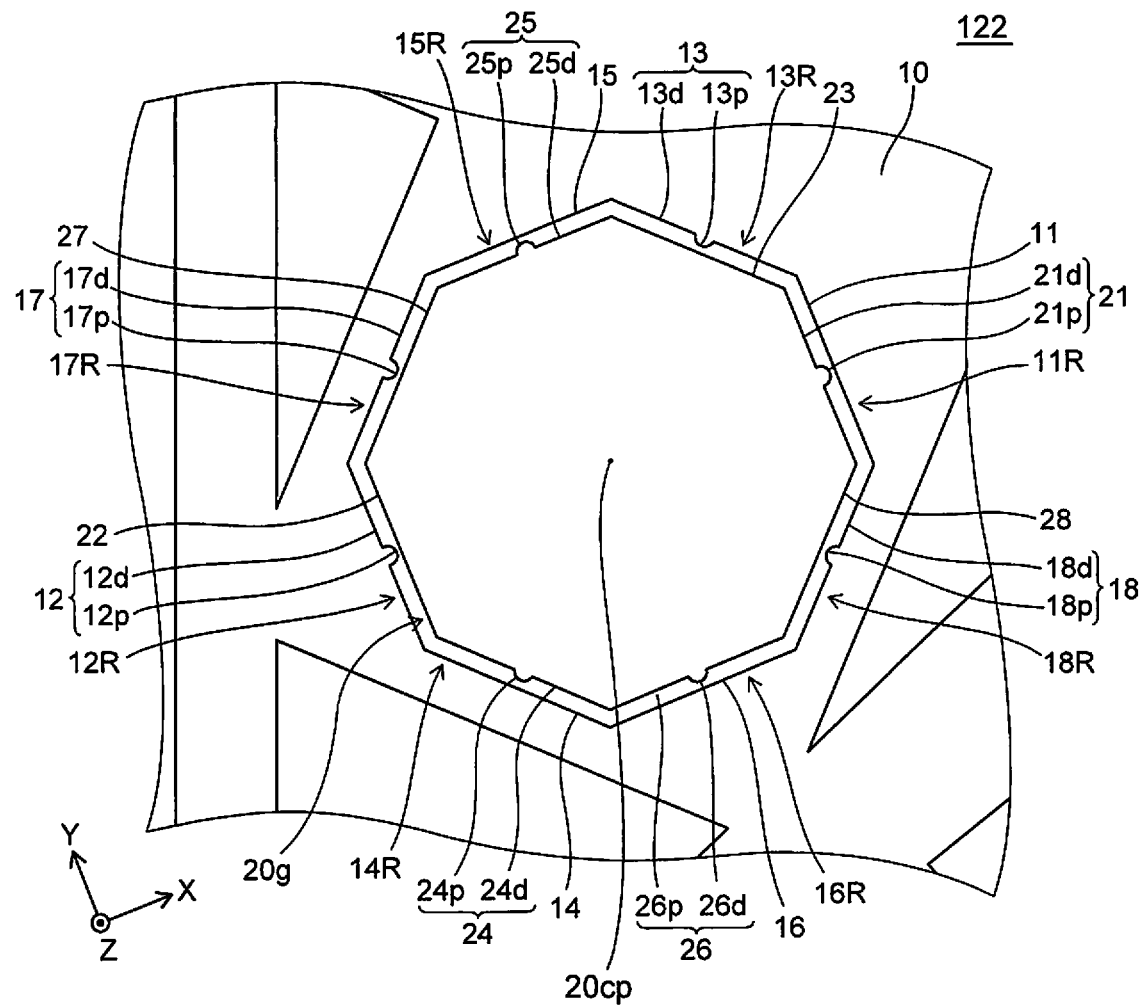
FIG. 13 is a schematic plan view illustrating a sensor according to a sixth embodiment.

FIG. 13 is a schematic plan view illustrating a sensor according to a sixth embodiment.

FIG. 13 illustrates an enlarged portion of the sensor 122 according to the embodiment. The sensor 122 also includes the movable member 10 and the first fixed member 20. The structures of the movable member 10 and the first fixed member 20 of the sensor 122 are different from those of the sensor 120. Otherwise, the configuration of the sensor 122 is the same as the configuration of the sensor 120. In the sensor 122, protruding portions are provided in portions of the movable member 10; and protruding portions are provided in portions of the first fixed member 20. For example, the first to eighth fixed protruding portions 21p to 28p or the first to eighth movable protruding portions 11p to 18p are provided.

In the sensors 120 to 122 as well, the size of the sensor can be small. Or, for the same size, the signal based on the movement of the movable member 10 is obtained more stably. By providing the protruding portions, the movable member 10 and the first fixed, member 20 are easily separated from each other. In the embodiment as well, it is easier to maintain a more stable detection.

The embodiments may include the following configurations (e.g., technological proposals).

Configuration 1

A sensor, comprising:
a movable member including a first movable portion and a second movable portion; and
a first fixed member,
at least a portion of the first fixed member being between the first movable portion and the second movable portion,
the first fixed member including
a first fixed counter portion opposing the first movable portion, and
a second fixed counter portion opposing the second movable portion,
the first fixed counter portion including a first fixed protruding portion protruding toward the first movable portion,
the second fixed counter portion including a second fixed protruding portion protruding toward the second movable portion.

Configuration 2

The sensor according to Configuration 1, wherein
the first fixed counter portion includes a first fixed non-protruding portion other than the first fixed protruding portion, and
a curvature of the first fixed non-protruding portion is less than a curvature of the first fixed protruding portion.

Configuration 3

The sensor according to Configuration 1, wherein
the first fixed counter portion includes a first fixed non-protruding portion other than the first fixed protruding portion,
the first fixed non-protruding portion is substantially a plane, and
at least a portion of the first movable portion has a substantially planar configuration.

Configuration 4

The sensor according to any one of Configurations 1 to 3, wherein
the movable member further includes a third movable portion and a fourth movable portion,
a direction from the fourth movable portion toward the third movable portion crosses a direction from the second movable portion toward the first movable portion,
the first fixed member further includes:
a third fixed counter portion opposing the third movable portion; and
a fourth fixed counter portion opposing the fourth movable portion,
the third fixed counter portion includes a third fixed protruding portion protruding toward the third movable portion, and
the fourth fixed counter portion includes a fourth fixed protruding portion protruding toward the fourth movable portion.

Configuration 5

The sensor according to Configuration 4, wherein the direction from the fourth movable portion toward the third movable portion is oblique to the direction from the second movable portion toward the first movable portion.

Configuration 6

A sensor, comprising:
a movable member including a first movable portion and a second movable portion; and
a first fixed member,
at least a portion of the first fixed member being between the first movable portion and the second movable portion,
the first fixed member including
a first fixed counter portion opposing the first movable portion, and
a second fixed counter portion opposing the second movable portion,
the first movable portion including a first movable protruding portion protruding toward the first fixed counter portion, the second movable portion including a second movable protruding portion protruding toward the second fixed counter portion.

Configuration 7

The sensor according to Configuration 6, wherein
the first movable portion includes a first movable non-protruding portion other than the first movable protruding portion, and
a curvature of the first movable non-protruding portion is less than a curvature of the first movable protruding portion.

Configuration 8

The sensor according to Configuration 6, wherein
the first movable portion includes a first movable non-protruding portion other than the first movable protruding portion,
the first movable non-protruding portion is substantially a plane, and
at least a portion of the first fixed counter portion has a substantially planar configuration.

Configuration 9

The sensor according to any one of Configurations 6 to 8, wherein
the movable member further includes a third movable portion and a fourth movable portion,
a direction from the fourth movable portion toward the third movable portion crosses a direction from the second movable portion toward the first movable portion,
the first fixed member further includes:
a third fixed counter portion opposing the third movable portion; and
a fourth fixed counter portion opposing the fourth movable portion,
the third movable portion includes a third movable protruding portion protruding toward the third fixed counter portion, and
the fourth movable portion includes a fourth movable protruding portion protruding toward the fourth fixed counter portion.

Configuration 10

The sensor according to Configuration 9, wherein the direction from the fourth movable portion toward the third movable portion is oblique to the direction from the second movable portion toward the first movable portion.

Configuration 11

A sensor, comprising;
a movable member including a first movable portion and a second movable portion; and
a first fixed member,
at least a portion of the first fixed member being between the first movable portion and the second movable portion,
the first fixed member including
a first fixed counter portion opposing the first movable portion, and
a second fixed counter portion opposing the second movable portion,
the first fixed counter portion including a first fixed protruding portion protruding toward the first movable portion,
the second movable portion including a second movable protruding portion protruding toward the second fixed counter portion.

Configuration 12

A sensor, comprising:
a movable member including a first movable portion and a second movable portion; and
a first fixed member,
at least a portion of the first fixed member being between the first movable portion and the second movable portion,
the first fixed member including
a first fixed counter portion opposing the first movable portion, and
a second fixed counter portion opposing the second movable portion,
the first movable portion including a first movable protruding portion protruding toward the first fixed counter portion,
the second fixed counter portion including a second fixed protruding portion protruding toward the second movable portion.

Configuration 13

The sensor according to any one of Configurations 1 to 12, wherein
the movable member includes a first movable side portion and a second movable side portion,
the first movable portion is connected to the first movable side portion and the second movable side portion between the first movable side portion and the second movable side portion,
the first fixed member includes:
a first fixed counter side portion opposing the first movable side portion and being provided along the first movable side portion; and
a second fixed counter side portion opposing the second movable side portion and being provided along the first movable side portion,
a plane including the first movable side portion crosses a plane including the first movable portion, and
a plane including the second movable side portion crosses the plane including the first movable portion.

Configuration 14

The sensor according to Configuration 13, wherein
the plane including the first movable side portion is oblique to the plane including the first movable portion, and
the plane including the second movable side portion is oblique to the plane including the first movable portion.

Configuration 15

The sensor according to any one of Configurations 1 to 14, further comprising:
a base body;
a second fixed member fixed to the base body; and
a connection portion,
the first fixed member being fixed to the base body,
the connection portion connecting the second fixed member and the movable member,
the connection portion holding the movable member.

Configuration 16

The sensor according to Configuration 15, wherein
a plurality of the first fixed members is provided, and
the plurality of first fixed members is provided around the second fixed member in a plane, the plane crossing a direction from the base body toward the second fixed member.

Configuration 17

The sensor according to Configuration 16, wherein the movable member is provided around the plurality of first fixed members in the plane.

Configuration 18

The sensor according to Configuration 16 or 17, further comprising a plurality of third fixed members fixed to the base body,
the plurality of third fixed members being provided around the movable member in the plane.

Configuration 19

The sensor according to any one of Configurations 16 to 18, further comprising:
a first structure body fixed to the base body, the first structure body and the movable member opposing each other in a comb teeth configuration; and
a controller electrically connected to the first structure body and the movable member,
the controller generating, in the movable member, a vibration referenced to the first structure body.

Configuration 20

The sensor according to Configuration 19, wherein the controller is electrically connected to the movable member via the second fixed member.

Configuration 21

The sensor according to Configuration 19, wherein the controller outputs a signal corresponding to a change of the vibration when a force is applied to the movable member.

According to the embodiments, a sensor can be provided in which stable detection is possible.

In the specification of the application, "perpendicular" and "parallel" refer to not only strictly perpendicular and strictly parallel but also include, for example, the fluctuation due to manufacturing processes, etc. It is sufficient to be substantially perpendicular and substantially parallel.

Hereinabove, exemplary embodiments of the invention are described with reference to specific examples. However, the embodiments of the invention are not limited to these specific examples. For example, one skilled in the art may similarly practice the invention by appropriately selecting specific configurations of components included in sensors such as movable members, fixed members, protruding portions, controllers, etc., from known art. Such practice is included in the scope of the invention to the extent that similar effects thereto are obtained.

Further, any two or more components of the specific examples may be combined within the extent of technical feasibility and are included in the scope of the invention to the extent that the purport of the invention is included.

Moreover, all sensors practicable by an appropriate design modification by one skilled in the art based on the sensors described above as embodiments of the invention also are within the scope of the invention to the extent that the spirit of the invention is included.

Various other variations and modifications can be conceived by those skilled in the art within the spirit of the invention, and it is understood that such variations and modifications are also encompassed within the scope of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. A sensor, comprising:
a movable member including a first movable portion and a second movable portion;
a base body;
a first fixed member fixed to the base body;
a second fixed member fixed to the base body, the movable member being provided around the second fixed member in a plane crossing a first direction from the base body toward the second fixed member; and
a connection portion connecting the second fixed member and the movable member, the connection portion supporting the movable member,
the first fixed member piercing the movable member in the first direction, a part of the movable member being provided between the second fixed member and the first fixed member,
at least a portion of the first fixed member being between the first movable portion and the second movable portion,
the first fixed member including a portion having a polygonal shape in the plane,
the first fixed member including
a first fixed counter portion provided at a first corner of the portion having the polygonal shape, the first fixed counter portion opposing the first movable portion, and
a second fixed counter portion provided at a second corner of the portion having the polygonal shape, the second fixed counter portion opposing the second movable portion,
the first fixed counter portion including a first fixed protruding portion protruding toward the first movable portion,
the second fixed counter portion including a second fixed protruding portion protruding toward the second movable portion,
a flat portion of the first movable portion facing the first fixed protruding portion, and the flat portion of the first movable portion having a substantially planar configuration.

2. The sensor according to claim 1, wherein
the first fixed counter portion includes a first fixed non-protruding portion other than the first fixed protruding portion, and
a curvature of the first fixed non-protruding portion is less than a curvature of the first fixed protruding portion.

3. The sensor according to claim 1, wherein
the first fixed counter portion includes a first fixed non-protruding portion other than the first fixed protruding portion, and
the first fixed non-protruding portion is substantially a plane.

4. The sensor according to claim 1, wherein
the movable member further includes a third movable portion and a fourth movable portion,
a direction from the fourth movable portion toward the third movable portion crosses a direction from the second movable portion toward the first movable portion,
the first fixed member further includes:
a third fixed counter portion provided at a third corner of the portion having the polygonal shape, the third fixed counter portion opposing the third movable portion; and
a fourth fixed counter portion provided at a fourth corner of the portion having the polygonal shape, the fourth fixed counter portion opposing the fourth movable portion,
the third fixed counter portion includes a third fixed protruding portion protruding toward the third movable portion, and
the fourth fixed counter portion includes a fourth fixed protruding portion protruding toward the fourth movable portion.

5. The sensor according to claim 4, wherein the direction from the fourth movable portion toward the third movable portion is oblique to the direction from the second movable portion toward the first movable portion.

6. The sensor according to claim 1, wherein
the movable member includes a first movable side portion and a second movable side portion,
the first movable portion is connected to the first movable side portion and the second movable side portion between the first movable side portion and the second movable side portion,
the first fixed member includes:
 a first fixed counter side portion opposing the first movable side portion and being provided along the first movable side portion; and
 a second fixed counter side portion opposing the second movable side portion and being provided along the first movable side portion,
a plane including the first movable side portion crosses a plane including the first movable portion, and
a plane including the second movable side portion crosses the plane including the first movable portion.

7. The sensor according to claim 6, wherein
the plane including the first movable side portion is oblique to the plane including the first movable portion, and
the plane including the second movable side portion is oblique to the plane including the first movable portion.

8. The sensor according to claim 1, wherein
a plurality of first fixed members is provided, and
the plurality of first fixed members is provided around the second fixed member in the plane.

9. The sensor according to claim 8, wherein the movable member is provided around the plurality of first fixed members in the plane.

10. The sensor according to claim 8, further comprising a plurality of third fixed members fixed to the base body,
the plurality of third fixed members being provided around the movable member in the plane.

11. The sensor according to claim 8, further comprising:
a first structure body fixed to the base body, the first structure body and the movable member opposing each other in a comb teeth configuration; and
a controller electrically connected to the first structure body and the movable member,
the controller generating, in the movable member, a vibration referenced to the first structure body.

12. The sensor according to claim 11, wherein the controller is electrically connected to the movable member via the second fixed member.

13. A sensor, comprising:
a movable member including a first movable portion and a second movable portion;
a base body;
a plurality of first fixed members being fixed to the base body;
a second fixed member fixed to the base body, the movable member being provided around the second fixed member in a plane crossing a first direction from the base body toward the second fixed member; and
a connection portion connecting the second fixed member and the movable member, the connection portion supporting the movable member,
the plurality of first fixed members piercing the movable member in the first direction, a part of the movable member being provided between the second fixed member and the plurality of first fixed members,
the plurality of first fixed members being arranged on a circumference having the second fixed member at a center in the plane,
at least a portion of one of the plurality of first fixed members being between the first movable portion and the second movable portion,
the one of the plurality first fixed members including a portion having a polygonal shape in the plane,
the one of the plurality of first fixed members including
 a first fixed counter portion provided at a first corner of the portion having the polygonal shape, the first fixed counter portion opposing the first movable portion, and
 a second fixed counter portion provided at a second corner of the portion having the polygonal shape, the second fixed counter portion opposing the second movable portion,
the first fixed counter portion including a first fixed protruding portion protruding toward the first movable portion, and
the second fixed counter portion including a second fixed protruding portion protruding toward the second movable portion.

14. The sensor according to claim 1, wherein no connection member connecting the first fixed member and the movable member is provided.

15. The sensor according to claim 13, wherein no connection member connecting the plurality of first fixed members and the movable member is provided.

* * * * *